United States Patent [19]

Ishizuka et al.

[11] 4,297,925
[45] Nov. 3, 1981

[54] TURRET HEAD FOR A LATHE

[76] Inventors: Shinichi Ishizuka; Kenji Sugimoto, both of c/o Citizen Watch Company Limited, No. 1-12, 6-chome, Hon-cho, Tanashi-shi, Tokyo, Japan

[21] Appl. No.: 29,556

[22] Filed: Apr. 12, 1979

[30] Foreign Application Priority Data

Jul. 15, 1978 [JP] Japan .................................. 53/85677
Jul. 15, 1978 [JP] Japan .................................. 53/85678

[51] Int. Cl.³ ............................................ B23B 29/32
[52] U.S. Cl. .................................... 82/2 R; 82/36 A; 74/826; 408/35
[58] Field of Search ...................... 82/2 R, 2 B, 36 A; 408/35; 74/826

[56] References Cited

U.S. PATENT DOCUMENTS

| | | | |
|---|---|---|---|
| 1,227,486 | 5/1917 | Newman et al. | 82/36 A |
| 3,798,721 | 3/1974 | Schalles | 82/36 A |
| 3,874,257 | 4/1975 | Hikota et al. | 82/36 A |
| 3,955,257 | 5/1976 | Herbst et al. | 408/35 X |
| 4,058,033 | 11/1977 | Lahm et al. | 82/2 R |
| 4,087,890 | 5/1978 | Ishizuka et al. | 408/35 X |

FOREIGN PATENT DOCUMENTS

12103 of 1901 United Kingdom ................. 82/2 R

Primary Examiner—Leonidas Vlachos
Attorney, Agent, or Firm—Holman & Stern

[57] ABSTRACT

A turret head for a lathe has an axis about which it can be rotated, the axis being in use inclined at about 45° to the axis of a spindle of the lathe. The head has a plurality of pairs of tool mounting surfaces, the pairs being spaced around the axis of the turrent head. The surfaces of each pair are substantially mutually perpendicular, and arranged so that one is perpendicular to the axis of the spindle, and the other parallel thereto, when the pair is brought to a working location by indexing the turret head about its axis.

3 Claims, 10 Drawing Figures

TURRET HEAD FOR A LATHE

TECHNICAL FIELD

This invention relates to turret heads for lathes, and is particularly but not exclusively related to turret heads for numerically controlled automatic lathes of the sliding headstock type.

BACKGROUND ART

The so-called Swiss-type automatic lathe is well known as a compact, highly accurate lathe for machining a workpiece which is long with respect to its diameter. This lathe possesses a characteristic structure comprising a sliding headstock, a guide bushing disposed in the direction of movement of the headstock, and five or six tool holders for the turning operation disposed about the guide bushing as a center and radiating outwardly therefrom. A Swiss-type automatic lathe utilizing a cam system in which the movement of the headstock and tool holders is controlled by cams is being widely used as a specialized machine for mass production. In recent years, however, the adoption of a numerical control system has made it possible to employ this lathe in medium and small-scale production as well. A number of numerically controlled lathes employing the cam system can be mentioned. In one system the rotation of the cam shafts is numerically controlled. In another, the radially disposed tool holders are individually driven by numerically controlled lead screws. Still another system makes use of the tool holders radially disposed about the guide bushing and employs a single numerically controlled cam which rotates about the guide bushing.

These systems all have a common drawback. Namely, since the tool holders are radially disposed and must be individually and sequentially moved, the individual supporting guideways must be small in size; hence, the tool holders do not possess sufficient rigidity.

The adoption of a numerical control system which makes possible a wide variety of production configurations leads to an increase in the kind of workpieces which can be machined. As a result, there is now a necessity for the machining of workpieces which have an enlarged diameter in comparison to such miniature components as timepieces which have mainly been machined by the Swiss-type automatic lathe. The maximum machining diameter which determines the capacity of the lathe has been increased to the point where the characteristic fundamental structure of the lathe cannot be maintained because of insufficient rigidity. There is also a demand for high productivity and hence a requirement that actual machining time and idle time be reduced. Insufficient rigidity, however, makes reduction of actual machining time a difficult goal to attain. Research has shown that, in a case where total working time exceeds two minutes, actual machining time occupies 80% of total working time and cannot be reduced because of the insufficient rigidity of the Swiss-type automatic lathe.

In an effort to overcome these shortcomings a numerically controlled automatic lathe of sliding headstock type, actually an improved Swiss-type automatic lathe, has already been proposed. The lathe is provided with sufficient rigidity by replacing the radially disposed tool holders with a turret head system and consolidating the guideways of the tool holders. This makes it possible to increase the maximum machining diameter up to approximately 30 mm which is the upper limit of the actual machining diameter that can be machined by a prior art machining method characteristic of machines that employ a guide bushing. Moreover, sufficient rigidity permits powerful machining so that actual machining time and the proportion of the total working time which it occupies can be greatly reduced.

However, with still greater demand for higher productivity, a problem arises in reducing the increased idle time ratio resulting from the reduction in the actual working time radio. Specifically, the conventional numerically controlled automatic lathe of sliding headstock type employing the turret head system possessed a serious drawback in that the demand for higher productivity could not be met since a reduction in idle time was limited by the great amount of time needed to index and position the turret. In order to shorten the indexing time it is important not only to raise the rotating speed of the turret head but also to reduce the acceleration and deceleration time needed to start and stop its rotation. It is therefore desirable to reduce the inertia of the turret head to the greatest possible extent, in other words, to minimize the rotating radius of the turret head.

This causes problems, particularly in a lathe of the type having a guide bushing, in which the turret head when arranged such that the path of each tool cutting edge is positioned at the mouth of the guide bushing, has a large rotating radius.

On the other hand, because of the increasing requirement for lathes, especially numerically controlled lathes, that can perform a wide variety of operations, it is desirable to mount as many tools on the turret head as possible, a measure that increases the number of turret head mounting surfaces to which tool supporting fixtures are attached. If it is assumed that the area of each mounting surface cannot be reduced below a certain level because of a loss of rigidity, the size of the turret shaft would inevitably be enlarged by increasing the number of tools, resulting in an increase of the turning radius of the head.

DISCLOSURE OF INVENTION

In accordance with the invention, there is provided a turret head for a lathe, the head having two tool mounting surfaces at each of a plurality of indexing positions spaced around an axis of the head about which, in use, the head can be rotated to bring the two surfaces at a selected position into a working location with one of said tool surfaces substantially parallel to an axis of a spindle on the lathe and the other substantially perpendicular thereto.

In the preferred embodiment described below, the head is in use mounted for rotation about an axis inclined at a predetermined angle to the central axis of the lathe's spindle. The two tool mounting surfaces at each position are mutually perpendicular, and each inclined at the predetermined angle to the turret head's axis.

Each surface can be provided with means for mounting thereon a supporting fixture for supporting a tool.

The tool carried by the surface which is parallel to the spindle axis can be used for drilling a workpiece or for machining the inside diameter thereof, and the tool carried by the surface which is perpendicular to the spindle axis can be used to machine the outside diameter of the workpiece.

A turret head in accordance with the invention can be constructed with a relatively small turning radius and low inertia, compared with the turret heads of the prior art, thus enabling a reduction of idle time by increasing indexing and position speed. The rigidity with which the tools are mounted can be increased to reduce actual machining time, and also the turret head can be provided with a large number of mounting surfaces to accommodate a large number of tools.

DETAILED DESCRIPTION OF PREFERRED EMBODIMENT

Figure 1:
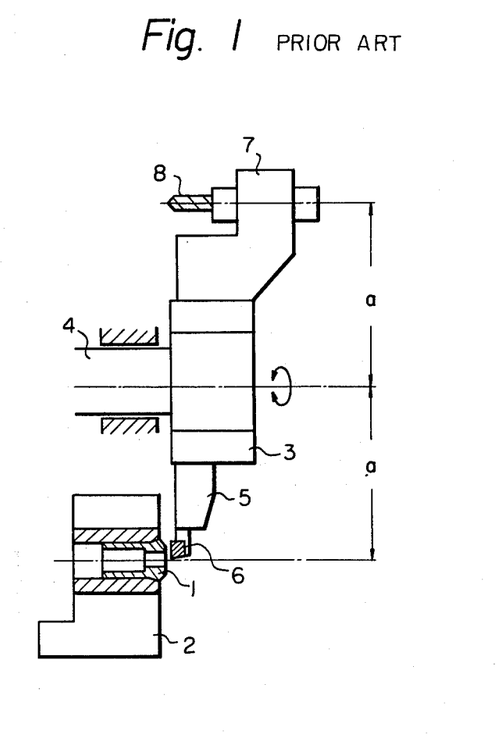
FIG. 1 is a diagram useful for describing a turret head employed in a conventional lathe.
Figure 2:
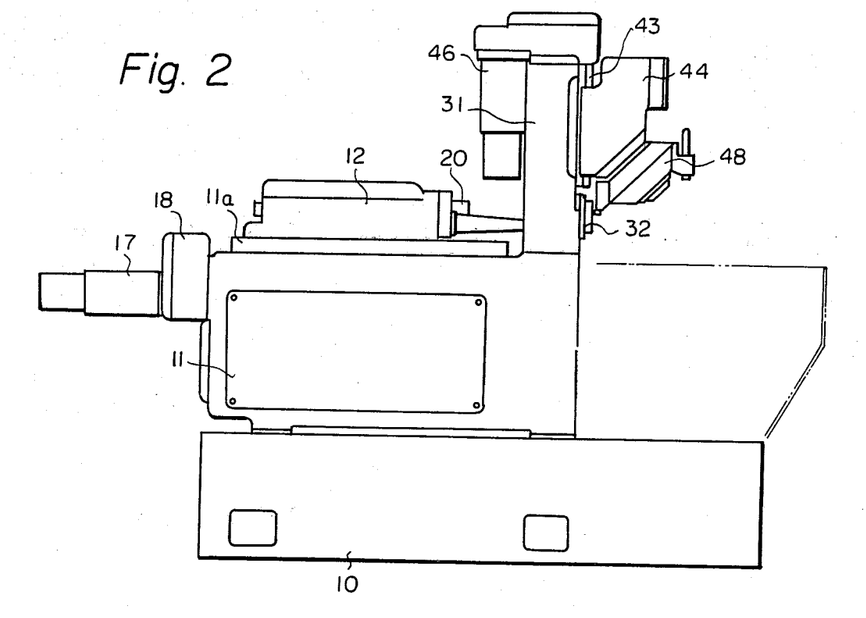
FIG. 2 is a front view of a numerically controlled automatic lathe of the sliding headstock type embodying the present invention.
Figure 3:
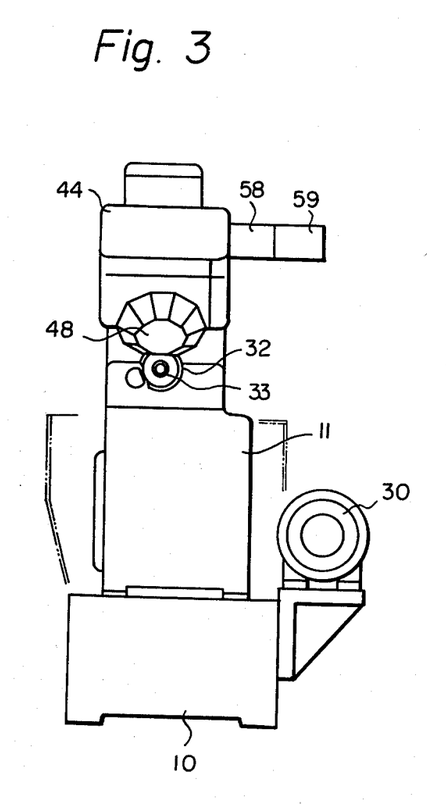
FIG. 3 is a side view, looking from the right, of the lathe shown in FIG. 2.
Figure 4:
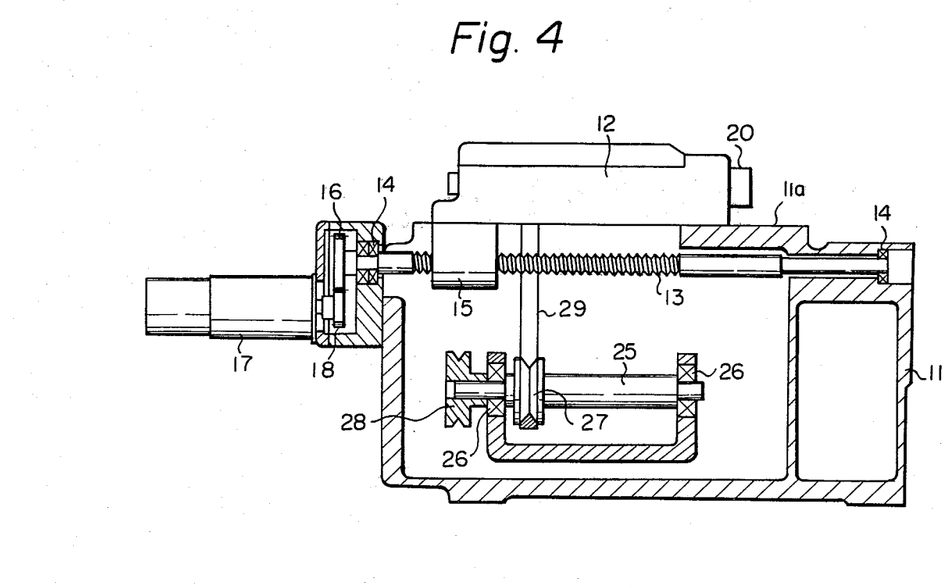
FIG. 4 is a cross-sectional view taken through the centre of the bed portion.

FIG. 1 shows a guide bushing 1, guide bushing support 2, turret head 3, turret shaft 4, tool holder 5, drill holder 7 mounted on the turret head 3, cutting tool 6, and a drill 8 held by the drill holder 7, all in accordance with a prior art arrangement. It is clear from the drawing that the central axis of turret shaft 4 is disposed parallel to the central axis of guide bushing 1 so that the turret 3 can position the cutting end of tool 6 and drill 8 in line with the mouth of guide bushing 1. The rotating radius a of the turret head 3 arranged in this manner is the radius of the turret head 3 increased approximately by the length of the shank of tool 6. This increase in inertia is particularly great when, in addition to the tool holder 5, the drill holder 7 having even a greater mass is mounted on the turret head.

Referring to FIGS. 2 to 8, which show a lathe having a turret head in accordance with the invention, reference numeral 10 denotes a stand, 11 a bed secured to the upper surface of the stand 10, and 12 a headstock slidably supported to move in a straight line on first guideways 11a horizontally disposed on the upper surface of bed 11. A lead screw 13 is supported by bearings 14 fitted into both ends of bed 11 and is positioned below first guideways 11a. A lead nut 15 threadedly engaged with lead screw 13 is connected to the lower surface of the headstock 12. A spur gear 16 mounted on one end of lead screw 13 meshes with a spur gear 18 mounted on the output shaft of a servo motor 17 serving as a numerical control element, whereby rotation of the servo motor 17 is transmitted to the lead screw 13. Controlling the rotation of servo motor 17 thus controls the sliding position of the headstock 12 via the lead screw 13 and lead nut 15.

Figure 5:
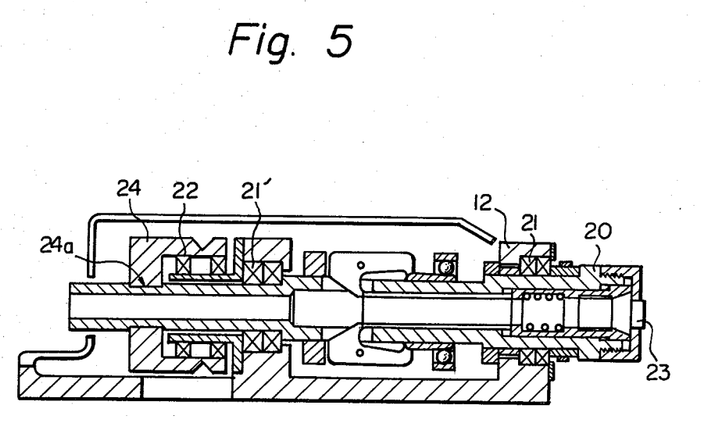
FIG. 5 is a cross-sectional view taken through the centre of the headstock portion.

The headstock 12 is provided with a hollow spindle 20 rotatably supported by bearings 21, 21' so as to lie parallel with the direction of movement of the headstock. A collet chuck 23 provided at the forward end of spindle 20 grips a workpiece inserted from the rearward end of the spindle. A spindle pulley 24 provided at the rearward end of spindle 20 and rotatably supported by the headstock 12 through a bearing 22 is adapted to rotate the spindle 20 by means of a spline 24a. Provided within bed 11 is a spline shaft 25 arranged in parallel with spindle 20 and supported for free rotation by bearings 26. A moving pulley 27 is splined on spline shaft 25 and is capable of movement in unison with headstock 12, and a stationary pulley 28 is fixed to one end of spline shaft 25. A V-belt 29 couples spindle pulley 24 and moving pulley 27 to each other. The rotation of a spindle motor 30 provided at the back of bed 11 is transmitted to stationary pulley 28 by a known belt mechanism so that moving pulley 27 is rotated by the spline shaft 25. This rotation is transmitted to spindle 20 through V-belt 29, spindle pulley 24 and spline 24a.

Figure 6:
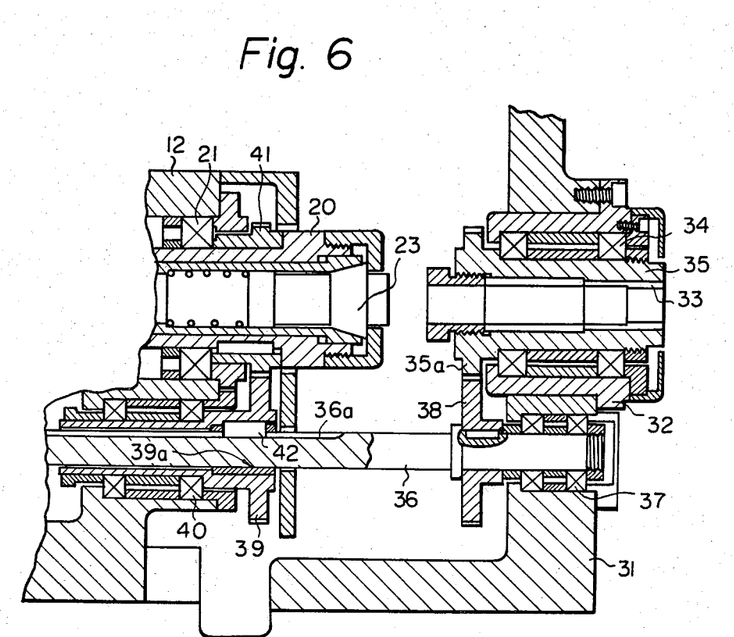
FIG. 6 is a cross-sectional view taken through the centre of the guide bushing portion.

A vertically extending column 31 is fixed to the upper surface of bed 11 at the forward end thereof. A guide bushing holder 32 is fitted into and secured to column 31, and a guide bushing 33 in coaxial relation with spindle 20 is inserted in a sleeve 35 rotatably supported in guide bushing holder 32 by a bearing 34. In use, the guide bushing 33 supports an inserted workpiece projecting from the collet chuck 23 of spindle 20, resists the force applied during machining and prevents vibration. Two kinds of guide bushing are available depending on the workpiece material and its diameter. One type of guide bushing does not itself rotate, but supports the workpiece by the sliding contact existing therebetween. The other rotates in unison with the spindle 20 and supports the workpiece without sliding contact. It is the latter of these two that is employed in the present embodiment. The synchronized rotation of the spindle 20 and the guide bushing 33 is accomplished in the following manner.

A rotary shaft 36 which allows spindle 20 to rotate guide bushing 33 is supported by column 31 by means of a bearing 37. A spur gear 38 mounted on rotary shaft 36 meshes with a spur gear 35a formed at the rear end of sleeve 35. Another spur gear 39 is rotatably supported by headstock 12 by means of a bearing 40 and meshes with a spur gear 41 fixed to the forward end of spindle 20 thereby to rotate in unison with the spindle. Rotary shaft 36 is slidably inserted into a central through-hole 39a formed in the gear 39. A key 42 secured in the side of the gear 39 fits into a key groove 36a formed in rotary shaft 36. This arrangement allows spindle 20 freely and synchronously to rotate guide bushing 33 through rotary shaft 36 as headstock 12 undergoes sliding movement.

Figure 7:
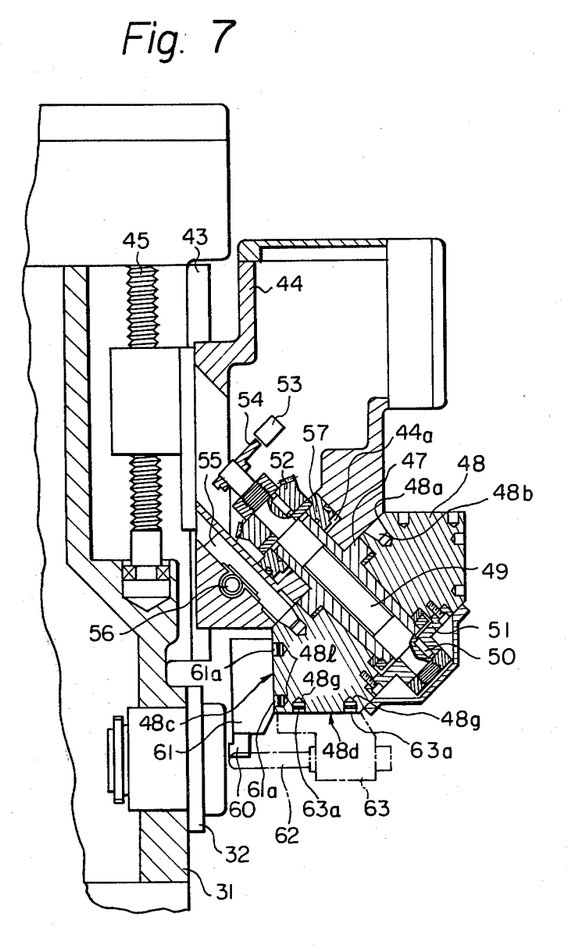
FIG. 7 is a cross-sectional view taken through the centre of the column and turret head section.

Formed in column 31 are vertically extending second guideways 43 lying in a plane that intersects the central axis of spindle 20 at a right angle. A saddle 44 slides substantially vertically on second guideways 43 directly above guide bushing 33, and a lead screw 45 supported by column 31 numerically controls the sliding motion of saddle 44 when the screw is rotated by servo motor 46, the saddle thus being controlled in the same manner as the headstock 12.

A support shaft 47 is fixedly supported by saddle 44 and disposed such that its axis intersects the central axis of spindle 20 at a predetermined angle of, for example, 45 degrees. A turret head 48 is rotatably mounted on the support shaft 47, and a turret head drive shaft 49 supported by the support shaft 47 is equipped with a transmission disc 51 connected to one end of the shaft 49 by a key 50 and fixed at its circumferential portion to the turret head 48. A bevel gear 52 is fixed to the other end of the drive shaft 49, and a contact switch 53 for detecting the indexing position of the turret head 48 is disposed in close proximity to a contact member 54.

A positioning pin 55 supported by saddle 44 has a side surface in the form of a rack, and a pinion 56 which engages with the rack portion of the positioning pin and is rotated back and forth by a motor (not shown) causes the positioning pin to slidingly reciprocate.

The sliding surface 48a of turret head 48 where the turret head slides against the saddle 44 is provided with a number n of equally angularly spaced apart positioning holes 48b corresponding to the number of indexing stations. The turret head 48 is fixedly positioned when the positioning pin 55 is caused to protrude and engage in one of the positioning holes 48b.

The support shaft 47 at the end portion where it is inserted into saddle 44 is provided with a piston 57. When pressurised oil is fed into the righthand chamber 44a of a cylinder formed in saddle 44, the turret head 48 is urged against saddle 44 by a force transmitted from the piston 57 through the bevel gear 52, the drive shaft 49 and the transmission disc 51.

At the side of saddle 44 there is provided a servo motor 58 for indexing the turret head, and an encoder 59 mounted on the rear side of the servo motor is adapted to detect signals indicative of servo motor rotation. The servo motor 58 rotates the turret head 48 by a gear train that begins with a spur gear mounted on the output shaft of the servo motor and terminates with the bevel gear 52.

Turret head 48, at each of the prescribed indexing positions determined by the engagement of the positioning pin 55 in each of the n positioning holes 48b, is provided with a first flat surface 48c which intersects the central axis of spindle 20 at a right angle and a second flat surface 48d which is parallel to the central axis of the spindle. The turret head 48 comprises two polyhedrons connected such that the bases of n regular pyramids, each of whose bases and sloping surfaces form a predetermined angle of, for example 45 degrees, are connected in common. The turret head 48 thus has two mutually perpendicular mounting surfaces at each of its indexing positions.

Figure 8:
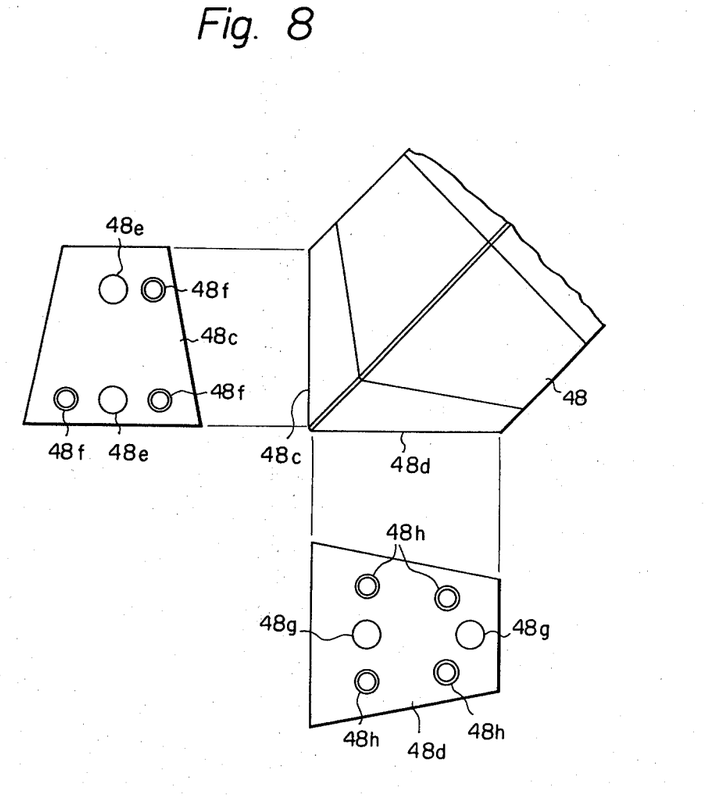
FIG. 8 is a detailed view of a tool mounting surface of the turret head.

As shown in FIG. 7, a cutting tool 60 generally used to machine the outside diameter of a workpiece is arranged to perpendicularly cross the central axis of spindle 20. The first flat surface 48c therefore is made to serve as the mounting surface for the supporting fixture 61 of cutting tool 60. The central portion of the first flat surface 48c, as can be more clearly seen in FIG. 8, is provided with two positioning holes 48e having a prescribed positional relationship, and with three screw holes 48f. These holes and their corresponding positioning pins 61a and mounting bolts, respectively, serve to fixedly support the supporting fixture 61. Meanwhile, a drill 62 for drilling or for working the inside diameter of a workpiece, or tool such as a bore cutting tool, is arranged in a coaxial or parallel relationship with respect to the central axis of spindle 20. The second flat surface 48d therefore is made to serve as the mounting surface for the supporting fixture 63 of drill 62 or the like. As shown in FIG. 8, the central portion of the second flat surface 48d is provided with two positioning holes 48g having a prescribed positional relationship, and with four screw holes 48h. These holes and their corresponding positioning pins 63a and mounting bolts serve to fixedly support the supporting fixture 63.

As mentioned above, it is possible to use at the same indexing position the first flat surface 48c or the second flat surface 48d as required.

To machine a workpiece the lathe operates in the following manner. A workpiece which has been passed through the hollow spindle 20 is gripped by collet chuck 23 in such a manner that the projecting leading end of the workpiece is inserted into and supported by the guide bushing 33. By regulating the position of the headstock 12 the portion of the workpiece which is to be maachined is positioned at the mouth of the guide bushing 33. Actuating spindle motor 30 causes the spindle 20 to rotate at a prescribed speed thereby to rotate the workpiece, and either or both of headstock 12 and saddle 44 are numerically controlled for sliding movement to perform the desired machining.

To select the desired tool for machining the workpiece, the turret head 48 is indexed and positioned as follows. Upon a command from a numerical control device which designates the number of the desired selected indexing position, a turret control device located on a mechanical control panel is actuated and, by calculating the differential value between the number of the present turret head position and the number of the selected position, computes the angle through which the turret head must be rotated. If the turret head has n stations, the direction in which it is rotated will depend on whether the differential value exceeds n/2; the servo motor 58 is instructed to rotate such that the turret head is indexed through the smallest possible angle. Since the ratio of rotation of turret head 48 to the rotation of the output shaft of servo motor 58 is determined in advance, the angle through which it is necessary to rotate the turret head 48 must be converted into a corresponding amount of rotation of servo motor 58. This is detected by encoder 59 so that the servo motor 58 is stopped in response to a command when the prescribed rotation is achieved. When the motor stopping signal is received, pinion 56 rotates to project the leading end of positioning pin 55 into engagement with the prescribed positioning hole 48b to thereby position the turret 48. The indexing and positioning operation is completed when pressurised oil is fed into the right-hand chamber 44a of the cylinder to actuate piston 57 and thus bring turret head 48 into abutting pressured contact with saddle 44.

Turret 48 may be indexed again by draining the oil from chamber 44a in order to separate the turret head from saddle 44 and by withdrawing positioning pin 55 from positioning hole 48b. This permits the foregoing indexing operation to be repeated.

Despite the fact that a memory for recording the present position of turret head 48 at the time the lathe is started is not provided in the turret control device, it is still possible to make the necessary calculations for indexing the turret. For this purpose, the apparatus is provided with a function that returns the turret head to an original position. According to this function, once power is connected to the lathe a signal is applied to instruct the turret head 48 to rotate in one direction and a given position of the turret head is detected by the contact switch 53 to position the turret head at the given position.

A turret head in accordance with the present invention can be extremely effective in raising turret head turning speed and reducing the time required to start and stop the rotation of the turret, that is, in reducing turret head operation time. This can be more clearly understood from FIGS. 9 and 10.

Figure 9:
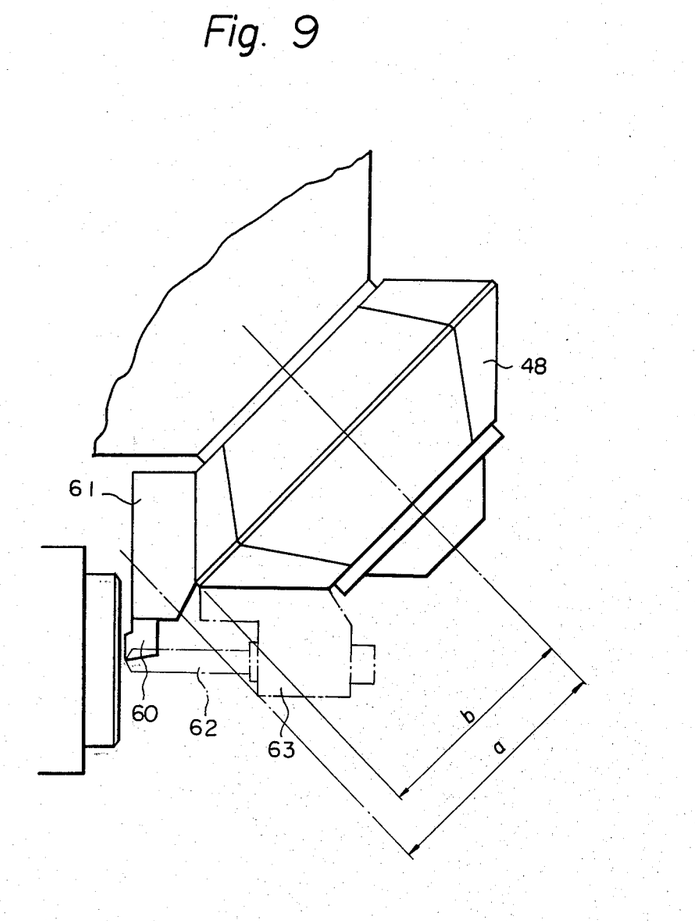
FIG. 9 is a diagram useful for describing the turning radius of the turret head in accordance with the present invention.
Figure 10:
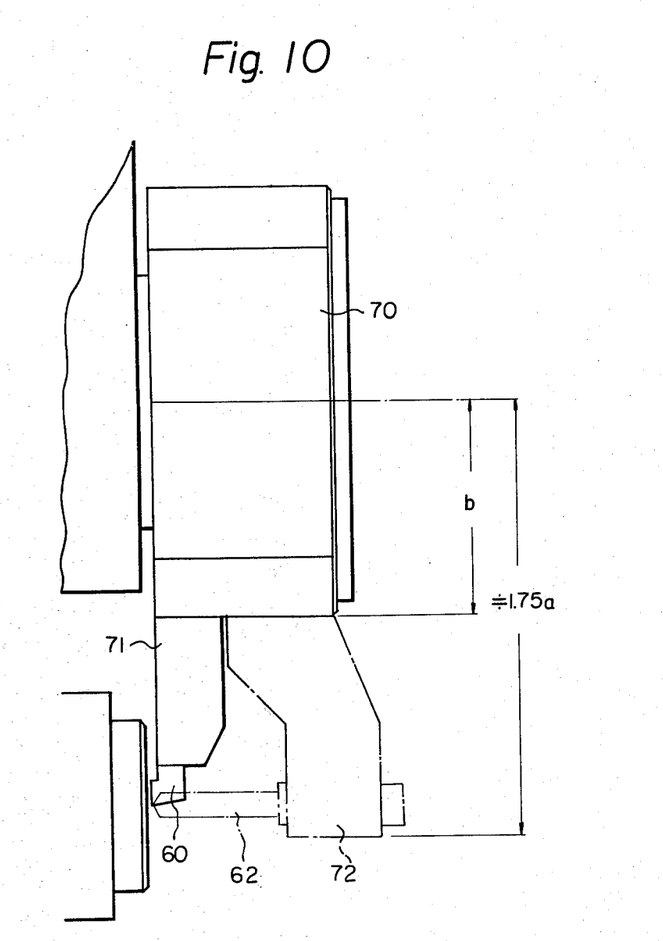
FIG. 10 is a diagram useful for describing the turning radius of a turret head in accordance with the prior art.

FIG. 9 illustrates a turret head 48 in accordance with the present invention. The turret head 48 is a polyhedron having 10 indexing positions obtained by combining 10 regular pyramids. FIG. 10 illustrates a turret head 70 generally in accordance with the prior art. The turret head 70 is also a polyhedron having 10 indexing positions obtained by combining 10 regular prisms. The turret heads 48, 70 are designed to support identical cutting tools 60 and drills 62 and thus have the same maximum turning radius b so that the areas of the respective mounting surfaces approximately equal. Cutting tool holders 61, 71 and drill holders 63, 72 are respectively attached to the two turret heads, which holders conform to the shape of their corresponding turret head. A comparison of the turning radius of each turret head, that is, the turning radius of each rigid body comprising a turret head and attached tool supporting fixture, reveals that the turning radius of turret head 70 is 1.75 times that of turret head 48. The inertia of turret head 70 is therefore approximately 9.4 times that of turret head 48 if differences in the longitudinal dimension are ignored. This means that the acceleration and deceleration time required to stop and start the two turret heads if they are rotated by a motor having the same torque is approximately 10 times greater in the case of turret head 70. This gives rise to a great difference in indexing time.

It will be appreciated from the above description that the turret head in accordance with the present invention as described above exhibits a number of outstanding effects. For example, the turning radius of the turret head can be minimized if tools identical in type and number to those mounted on the conventional turret head are mounted on the turret head of the present invention. This assists in raising the rotating speed of the turret head and reducing the acceleration and deceleration time necessary for starting and stopping the turret head and for indexing and positioning the same. This is helpful in enhancing lathe productivity.

Also, it is possible to mount at the same indexing position a tool for machining the outside diameter of a workpiece or a tool for machining the inside diameter of the workpiece as required. Either of the two tool mounting surfaces at each indexing position can be used at will. This assists in diversifying the lathe operation and enhancing its applicability.

Furthermore, the rigid mounting of the tools on the turret head provides greater machining action, and hence a reduction in machining time.

The numerically controlled automatic lathe described above has a variety of other advantages. For example, a sliding headstock and a guide bushing are provided, with machining at all times being conducted at the mouth of the guide bushing thereby enabling the highly precise machining of workpieces which are long with respect to their diameter. Also, a surface for guiding the sliding movement of the turret head is arranged at the forward end of the headstock directly above the guide bushing so that the overall space occupied by the lathe can be reduced. Moreover, supporting the guide bushing by the column minimizes the thermally and mechanically caused displacement of the turret head and guide bushing.

What is claimed is:

1. In a numerically controlled automatic lathe of the sliding headstock type comprising a spindle for supporting a workpiece and having a central axis, the improvement comprising:
    a turret head including a bore and having a first group of polygonal surfaces each oriented in one direction and a second group of polygonal surfaces each extending from the edge of each of said first group of polygonal surfaces and oriented in another direction substantially perpendicular to said each of said first group of said polygonal surfaces;
    said first group of said polygonal surfaces serving as means for mounting a first plurality of tool means for performing outside machining operation;
    said second group of polygonal surfaces serving as means for mounting a second plurality of tool means for performing inside machining operation;
    a saddle movable in a direction perpendicular to the central axis of said spindle and having a sliding surface facing said turret head;
    a hollow support shaft fixedly supported by said saddle and extending from the sliding surface of said saddle, such that its axis intersects the central axis of said spindle at a predetermined axis, said hollow support shaft including a portion slidably engaging the bore of said turret head to rotatably support said turret head;
    a turret head drive shaft disposed in and rotatably supported by said hollow support shaft, said turret head drive shaft having its end fixedly coupled to said turret head to cause said turret head to rotate around said hollow support shaft to index said turret head so as to bring ones of said first and second groups of polygonal surfaces to a working location in which said one of said first group of polygonal surfaces is substantially perpendicular to said central axis of said spindle and said one of said second group of polygonal surfaces is parallel to said central axis of said spindle;
    said saddle having a cylinder including a chamber;
    a piston member provided in said chamber at the end portion of said support shaft member;
    a transmission disc member connected to the end of said turret head drive shaft member and fixed at its circumferential portion to said turret head;
    gear means fixed to the other end of said turret head drive shaft member;
    said piston acting on the end portion of said drive shaft to urge said turret head against the sliding surface of said saddle by a force transmitted from said piston through said gear means, said drive shaft and said transmission disc member;
    said turret head having a plurality of positioning hole means;
    said sliding surface being perpendicular to said axis of said support shaft member; and
    a positioning member supported by said saddle and caused to protrude in one of said positioning hole means while at the same time said chamber of said saddle is supplied with a pressurized oil whereby said turret head is retained in a fixed position relative to said saddle by the action of said positioning member and the pressurized oil acting on said turret head through said piston, said drive shaft and said transmission disc member.

2. In a numerically controlled automatic lathe according to claim 1, wherein said axis of said support shaft member is inclined at about 45° to said central axis of said spindle.

3. A numerically controlled automatic lathe of the sliding headstock type comprising, in combination:
- a head having first horizontally extending guideways;
- a headstock slidable on said first guideways;
- a rotatably drived spindle carried by said headstock for supporting a workpiece and having a central axis;
- a column mounted on said head and having vertically extending second guideways situated in a plane substantially perpendicular to said central axis of said spindle;
- a turret head including a bore and having a first group of polygonal surfaces each oriented in one direction and a second group of polygonal surfaces each extending from the edge of each of said first group of polygonal surfaces and oriented in another direction substantially perpendicular to said each of said first group of said polygonal surfaces;
- said first group of said polygonal surfaces serving as means for mounting a first plurality of tool means for performing outside machining operation;
- said second group of said polygonal surfaces serving as means for mounting a second plurality of tool means for performing inside machining operation;
- a saddle movable in a direction perpendicular to the central axis of said spindle and having a sliding surface facing said turret head;
- a hollow support shaft fixedly supported by said saddle and extending from the sliding surface of said saddle, such that its axis intersects the central axis of said spindle at a predetermined axis, said hollow support shaft including a portion slidably engaging the bore of said turret head to rotatably support said turret head;
- a turret head drive shaft disposed in and rotatably supported by said hollow support shaft, said turret head drive shaft having its end fixedly coupled to said turret head to cause said turret head to rotate around said hollow support shaft to index said turret head so as to bring ones of said first and second groups of polygonal surfaces to a working location in which said one of said first group of polygonal surfaces is substantially perpendicular to said central axis of said spindle and said one of said second group of polygonal surfaces is parallel to said central axis of said spindle;
- said saddle having a cylinder including a chamber;
- a piston member provided in said chamber at the end portion of said support shaft member;
- a transmission disc member connected to the end of said turret head drive shaft member and fixed at its circumferential portion to said turret head;
- gear means fixed to the other end of said turret head drive shaft member;
- said piston acting on the end portion of said drive shaft to urge said turret head against the sliding surface of said saddle by a force transmitted from said piston through said gear means and said transmission disc member;
- said turret head having a plurality of positioning hole means;
- said sliding surface being perpendicular to said axis of said support shaft member; and
- a positioning member supported by said saddle and caused to protrude in one of said positioning hole means while at the same time said chamber of said saddle is supplied with a pressurized oil whereby said turret head is retained in a fixed position relative to said saddle by the action of said positioning member and the pressurized oil acting on said turret head through said piston, said drive shaft and said transmission disc member.

* * * * *